United States Patent
Gaskell

(10) Patent No.: US 7,018,166 B2
(45) Date of Patent: Mar. 28, 2006

(54) DUCTED WIND TURBINE

(75) Inventor: Christopher Norman Gaskell, Birmingham (GB)

(73) Assignee: FreeGen Research Ltd., Birmingham (GB)

( * ) Notice: Subject to any disclaimer, the term of this patent is extended or adjusted under 35 U.S.C. 154(b) by 0 days.

(21) Appl. No.: 10/482,009

(22) PCT Filed: Jun. 20, 2002

(86) PCT No.: PCT/GB02/02828

§ 371 (c)(1),
(2), (4) Date: Dec. 24, 2003

(87) PCT Pub. No.: WO03/002872

PCT Pub. Date: Jan. 9, 2003

(65) Prior Publication Data

US 2004/0156710 A1    Aug. 12, 2004

(30) Foreign Application Priority Data

Jun. 28, 2001 (GB) .................................. 0115876

(51) Int. Cl.
*F03D 1/02* (2006.01)
*F03D 1/04* (2006.01)
(52) U.S. Cl. ........................................ 415/4.3; 415/4.5
(58) Field of Classification Search ................ 415/1–5, 415/DIG. 1, DIG. 1 A; 416/235–236 A, 416/236 R, 121, 43 A, 121 A, 43
See application file for complete search history.

(56) References Cited

U.S. PATENT DOCUMENTS

| 2,330,907 | A | * | 10/1943 | Kern et al. .................. 415/185 |
| 2,485,543 | A | | 10/1949 | Andreau |
| 2,784,556 | A | | 3/1957 | Perdue |
| 3,904,324 | A | | 9/1975 | Flatt et al. |
| 4,075,500 | A | | 2/1978 | Oman et al. |
| 4,080,100 | A | * | 3/1978 | McNeese .................... 416/189 |
| 4,128,363 | A | * | 12/1978 | Fujikake et al. ........ 416/236 A |

(Continued)

FOREIGN PATENT DOCUMENTS

| DE | 3132404 | 5/1982 |
| DE | 3836325 | 8/1989 |

(Continued)

OTHER PUBLICATIONS

International Search Report, PCT Application No. PCT/GB02/02828, Filed Jun. 20, 2002, Date Completed Sep. 10, 2002.

*Primary Examiner*—Christopher Verdier
(74) *Attorney, Agent, or Firm*—Alston & Bird LLP

(57) ABSTRACT

The performance of a turbine in a duct having a convergent and a divergent surface is enhanced by controlling the fluid flow pattern along the inner duct surface. For this purpose a free rotor redistributes part of the inner fluid stream through a ring into the outer stream to prevent premature separation of the inner stream from the divergent duct surface. The turbine and rotor are driven by distinct fluid streams that are separated by a duct.

12 Claims, 3 Drawing Sheets

U.S. PATENT DOCUMENTS

| | | | |
|---|---|---|---|
| 4,132,499 A | | 1/1979 | Igra |
| 4,143,992 A | * | 3/1979 | Crook ......................... 415/220 |
| 4,222,710 A | * | 9/1980 | Katagiri et al. ......... 416/236 A |
| 4,265,596 A | * | 5/1981 | Katagiri et al. ......... 416/236 A |
| 4,422,820 A | | 12/1983 | Kirsch et al. |
| 4,781,522 A | * | 11/1988 | Wolfram ......................... 415/1 |
| 4,877,374 A | * | 10/1989 | Burkett ....................... 416/136 |
| 5,193,983 A | * | 3/1993 | Shyu ...................... 416/236 A |
| 5,836,738 A | * | 11/1998 | Finney ......................... 415/60 |

FOREIGN PATENT DOCUMENTS

| | | |
|---|---|---|
| DE | 20115330 | 11/2001 |
| GB | 514 811 | 11/1939 |
| GB | 1 016 295 | 1/1966 |
| GB | 1 341 257 | 12/1973 |
| GB | 1 525 342 | 9/1978 |
| WO | WO 00/50769 | 8/2000 |
| WO | WO 01/06122 A1 | 1/2001 |

* cited by examiner

DUCTED WIND TURBINE

TECHNICAL FIELD OF INVENTION

The present invention is related to a duct and free rotor combination used in energy conversion systems having means for extracting energy from a fluid stream. The invention is particularly applicable to Combined Augmentation Technology Turbines (CATT) for wind and underwater applications.

BACKGROUND OF THE INVENTION

There is global interest in the development of alternative energy sources especially wind power.

The electrical power generated by such wind machines is often transmitted considerable distances to centres of population, and one reason for this is that people usually live in sheltered terrain where the wind resource is more modest. The less concentrated energy in the wind in such areas reduces the economics of energy capture with conventional propellor wind turbines.

It has been proposed to develop devices that concentrate wind energy by increasing wind velocity, thus enabling wind with a lower velocity and energy density to be used where it is available. These proposals can potentially eliminate long power transmission lines.

One approach is a diffuser duct, which increases in cross-sectional area downstream of the propellor. This duct creates a lower pressure, thus drawing a faster air stream through the smaller diameter air inlet. Problems with diffusers typically include the control of turbulence when the airflow breaks away from the inner surface of the duct. This turbulence restricts flow and substantially reduces the benefit of a diffuser as wind velocity increases. U.S. Pat. No. 4,075,500 and U.S. Pat. No. 4,422,820 describe ducts which propose control of such turbulence by introducing external airflows through a series of orifices.

A similar arrangement is shown in U.S. Pat. No. 4,132,499, which includes a separate annular aerofoil. Other proposals are found in WO-A-00/50769 and WO-A-01/06122.

Another way of concentrating wind energy is described in U.S. Pat. No. 2,485,543 and U.S. Pat. No. 2,784,556. In this case a wind machine operates on the depression principle and has a wind driven propeller with hollow blades and apertures at the tips. Rotation of the propeller induces air in the hollow blades to flow out through the apertures in the blade tips. This in turn causes a lower pressure within the device, and by communicating through an air passage a faster stream of external air is drawn through the system.

An aim of this invention is to improve energy conversion of a conventional turbine by increasing the velocity of the local fluid stream.

STATEMENT OF THE INVENTION

According to the invention there is provided a duct assembly comprising an axial flow free rotor and a circular duct on the upstream side thereof, said duct being adapted to substantially separate a fluid stream into an inner stream within the duct and an outer stream outside the duct, said rotor having a hub with a plurality of arms extending radially outwardly from said hub, wherein each of said arms comprises a radially outer portion and a radially inner portion, the outer portions being responsive to said outer stream to cause the free rotor to rotate unidirectionally in use, and the inner portions defining extraction means adapted to draw fluid from said inner stream towards the free rotor from the upstream side thereof.

The present invention provides a free rotor adapted to be driven by the outer stream, the free rotor being situated in use downstream of an energy generation propeller or turbine and extracting a part of the inner stream that has flowed through the area described by this turbine. The inner stream is redistributed into the outer stream downstream of the free rotor.

In the specification the term 'rotor' is intended to generically describe any suitable fluid driven device, such as a propellor or turbine, whereby fluid stream energy is converted into rotation of a mechanical element.

When the fluid stream is flowing, the kinetic energy of the fluid acts on the free rotor blades to induce the rotation of the apparatus, and means are provided by which centrifugal and mechanical forces act on the inner stream, and cause part of it to flow radially outwardly to mix with the outer stream. By adapting the number and relative dimensions of rotor elements and components, the extraction rate of the inner stream and pattern across the swept area of the free rotor can be altered.

In accordance with one specific aspect of a preferred embodiment hollow rotor blades preferably extend outwards from the diameter of the duct and are driven by an outer fluid stream flowing over the outside surface of the duct. The rotor blades are preferably connected to a bearing hub by solid spars, and the apparatus is free to rotate. A preferred feature is a ring-like channel of a similar dimension to the diameter of the duct, positioned between the hollow rotor blades and spars. During rotation a part of the inner fluid stream is extracted by means of the inner surface of the circular ring shaped channels and inlets to hollow rotor blades. Advantageously the confined flow pattern through the duct can be controlled by adapting the free rotor in such a way as to vary the redistribution of the fluid and provide boundary layer control as a means of preventing premature fluid separation along the inner surface of the duct. Through passages of the hollow rotor blades direct the fluid through respective expel apertures into the outer stream moving downstream of the rotor. The rate of rotation of the free rotor has a relationship with the extraction rate and velocity of the primary fluid entering the duct, which can be determined empirically.

BRIEF DESCRIPTION OF DRAWINGS

Other features of the invention will be apparent from the description of several preferred embodiments shown by way of example only in the accompanying drawings in which.

DESCRIPTION OF PREFERRED EMBODIMENTS

Figure 1:
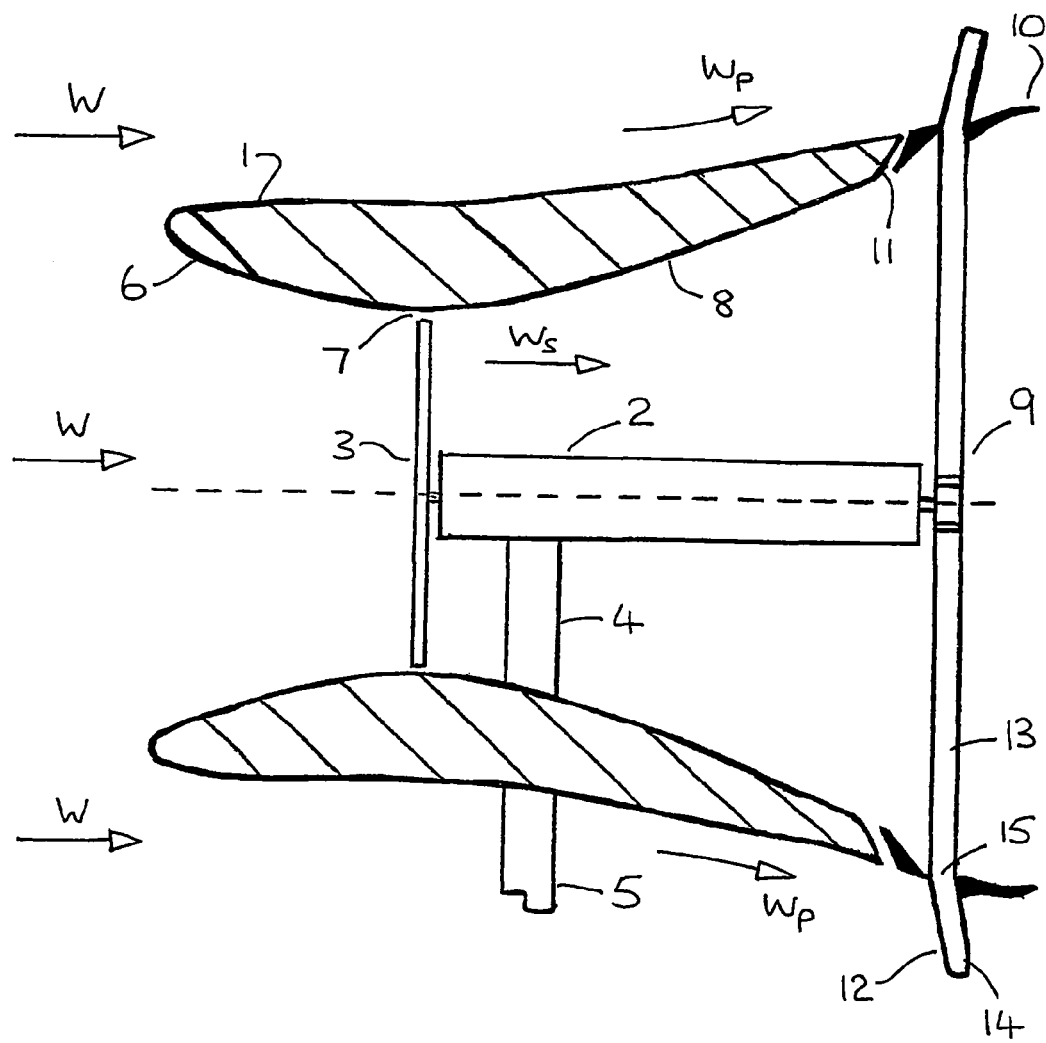
FIG. 1 is a cross-section of a duct and free rotor assembly according to a first embodiment of the invention.

FIG. 1 illustrates a mast 5 on which is mounted a circular convergent/divergent duct 1 of symmetrical form and having a convergent surface 6 and a divergent surface 8. Co-axially mounted in the duct 1 by one or more supports 4 is a centre body 2 within which is located a rotary generator (not shown). A drive rotor 3, typically a propellor, is connected to the generator and is rotatable about the axis thereof in response to an air stream represented by arrows W. The generator is of any suitable kind, typically converting mechanical energy of the propellor into electrical energy.

The duct 1 and/or mast 5 are pivotable so that the inlet 6 can be directed into the air stream, and means such as a rudder may effect automatic directional control. Alternatively the free rotor itself may be arranged to give a rudder effect. The centre body 2 and/or duct 1 is relatively pivotable in the preferred embodiment to permit feathering of the drive rotor 3 by turning out of the airstream.

As is well understood a convergent/divergent nozzle has a maximum flow velocity at the throat 7, and accordingly the drive rotor 3 is also arranged at or adjacent the throat in accordance with known principles of venturi design.

A free rotor 9 is provided at the downstream side of the centre body 2 and is mounted for free rotation on the axis of the drive rotor 3. The free rotor 9 consists of a plurality of radial arms 13 which terminate in blades 12. The arms 13 can be equally spaced and can be symmetrical and of equal length. As illustrated the free rotor is immediately adjacent the outer of the duct 1, and the blades 12 are wholly radially outside the periphery of the duct. The blades 12 can be of any suitable form, and are not shown in detail in the drawing.

The gap 11 between the free rotor 9 and the duct 1 should generally be as small as possible, depending on aerodynamic considerations. Furthermore in this embodiment the free rotor 9 has a generally axially extending ring 10 which extends on the leading and trailing side to assist extraction from the duct and to reduce turbulence. Other aerodynamic features may be added to stabilize flow through the duct so as to enhance the efficiency of energy conversion, and to improve the efficiency of air extraction.

The leading portion of the ring 10 directs fluid radially outwardly through inlets 15 to hollow blades 12, and then to respective exhaust openings 14 at the tips thereof. The corresponding inlet openings (not shown in detail) are provided in the arms 13 in the region of the outlet of the duct 1.

In operation, the duct 1 is generally faced directly into the air stream W, and as a consequence the drive rotor 3 rotates with resulting conversion of energy at the generator. Primary air $W_p$ flows over the outer surface of the duct 1 and acts on the blades 12 to cause the free rotor 9 to spin. This primary air $W_p$ has not given up energy in the drive rotor 3. Rotation of the free rotor causes a radially outward flow of air due to the ring 10. As a consequence the pressure of air immediately upstream of the free rotor 9 is reduced, and accordingly secondary air $W_s$ from the drive rotor 3 is sucked towards the free rotor 9. This in turn increases the velocity of air at the throat 7 of the duct 1 and thus the speed of the drive rotor 3. In this way energy conversion by the drive rotor 3 can be enhanced.

It will be appreciated that the proportions of the duct, the kind of drive rotor, the size and design of arms and many other variable features are matters of routine design and can be determined empirically or by calculation to suit circumstances at the installation site. In the same way aerodynamic features of any conventional kind may be added to improve energy conversion.

Figure 2:
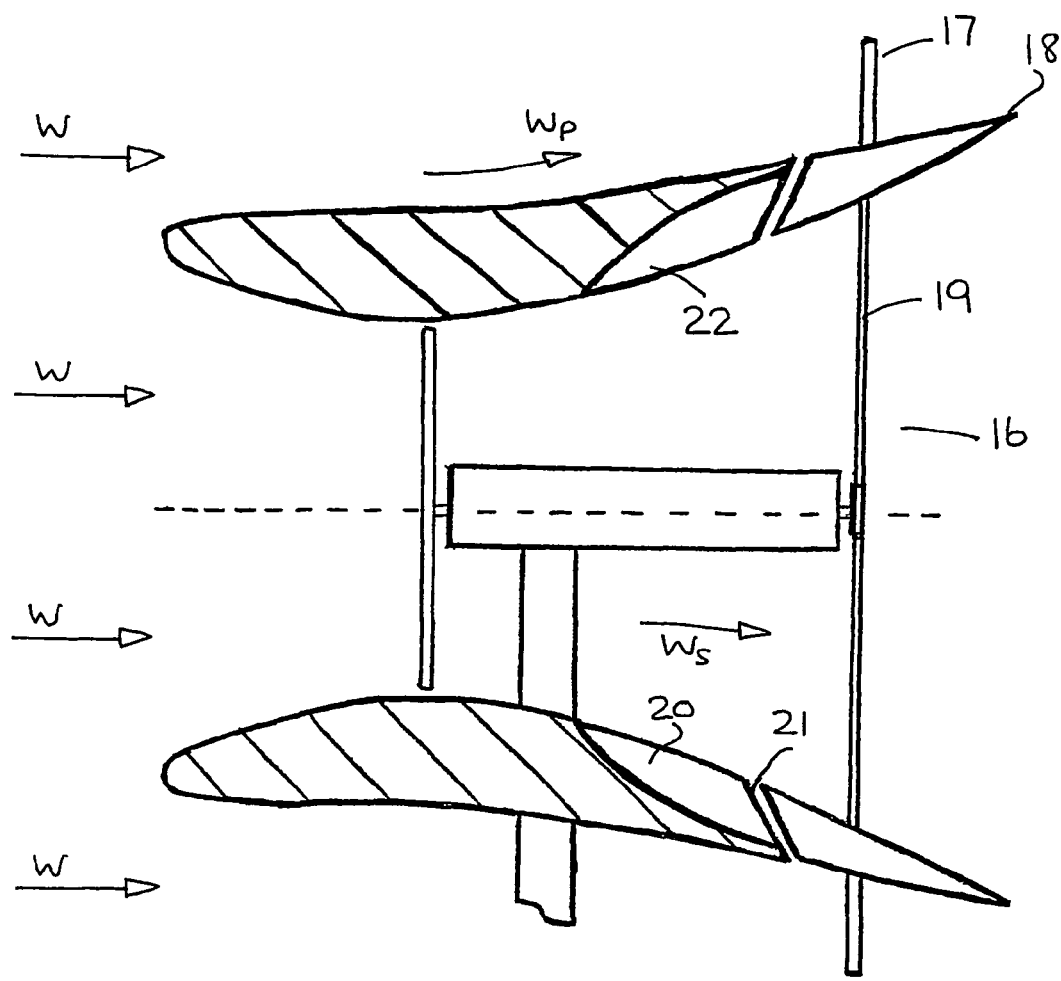
FIG. 2 is a cross-section of a second embodiment of the duct and free rotor assembly.

An alternative embodiment is illustrated in FIG. 2, and is particularly adapted for use in flowing water. The arrangement is generally as illustrated in FIG. 1, the free rotor 16 having solid spars 19 and primary drive blades 17. The spars 19 are designed to give the minimum resistance to rotation commensurate with adequate mechanical integrity of the free rotor 16. At the radially inner side of the drive blades 17, a circular array of secondary blades 18 are arranged to propel water from the duct to the downstream side. The duct incorporates stators or deflectors 21 in an annular chamber 20 to direct water to the secondary blades 18 in a generally 'S' shaped path.

It will be appreciated that the principle of operation of this embodiment is the same as that of FIG. 1, in that energy provided by primary fluid to the blades 17 is used to draw secondary fluid through the duct in a manner that produces a controlled flow across the inner surface, and thereby increase the velocity of water flowing over the drive rotor.

More than one free rotor may be provided in order to maximise energy recovery from the fluid stream. In one embodiment a plurality of free rotors are provided in series and having a common axis of rotation. Contra-rotating free rotors may be provided to counter torsional effects.

The device according to the invention may also include means to drive the free rotor at a minimum speed so as to ensure relatively smooth running in very light winds. It is envisaged that a small electric motor may be provided for this purpose, and that the free rotor may have considerable mass in order not to be strongly influenced by variations in the speed of the fluid stream.

In the case that exhaust apertures are provided at the tip of the free rotor, these apertures may be directed to assist rotation or to prevent or reduce rotation by means of a direction device such as a flap valve. This arrangement ensures against overspeeding in high winds. Other conventional speed control means may be included, including flexible vane elements and the like.

The duct may be defined by a mesh or the like in the region immediately upstream of the free rotor, particularly in the case of the embodiments having stator elements in the duct. Such an arrangement may be advantageous in controlling boundary layer effects.

Figure 3:
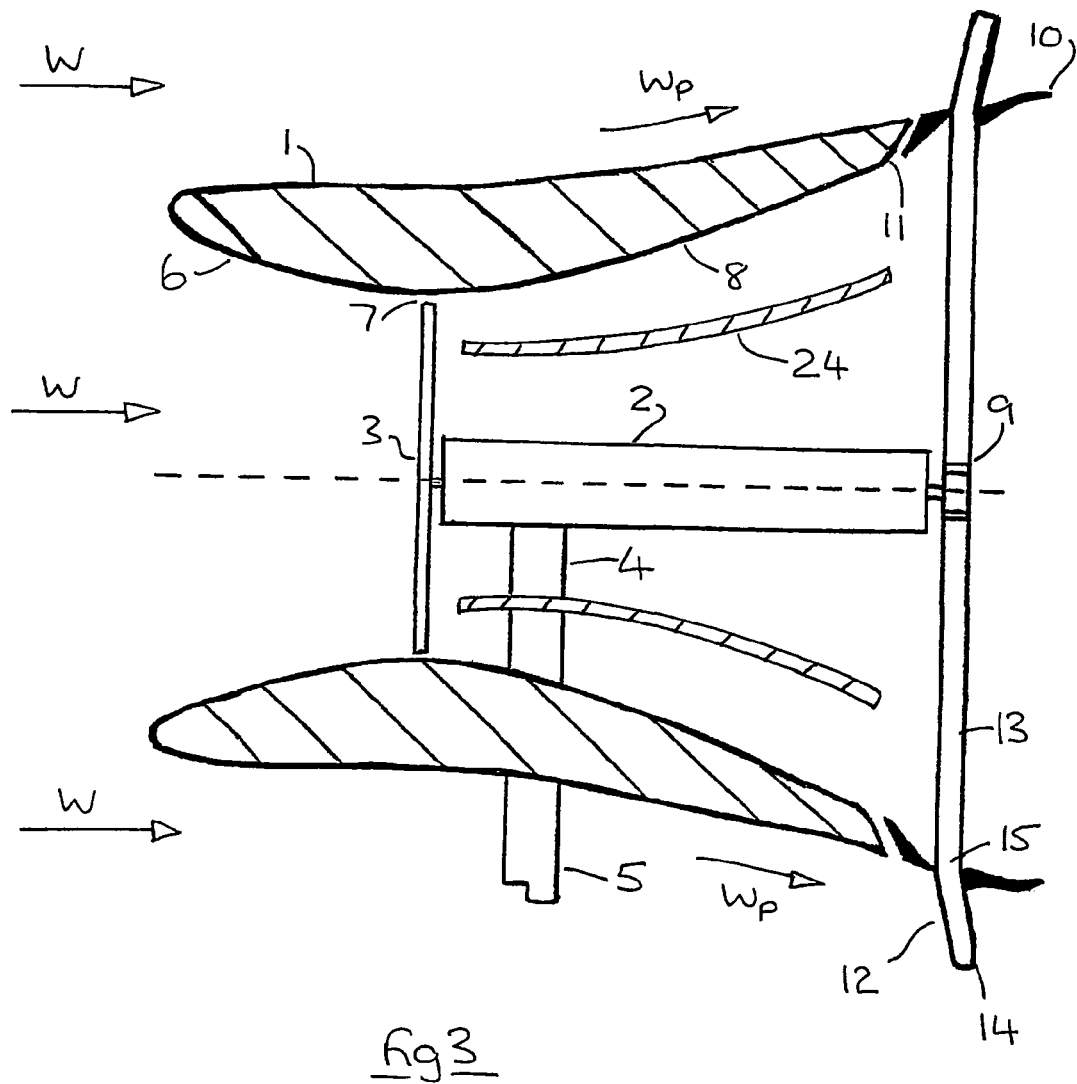
FIG. 3 is a-cross-section of a third embodiment including external and internal ducts.

In an alternative embodiment illustrated in FIG. 3 the duct may incorporate one or more internal ducts 24 so as to provide a nested array of generally coaxial surfaces which diverge towards the free rotor. The internal ducts define annular volumes upstream of the free rotor. Such an array can improve flow control between the inner surface of the outermost duct, and the centre body 2. The internal ducts perform the function of guiding the fluid stream. As the fluid stream passes over the internal ducts a lower pressure is created inside the internal ducts which further aids in sucking secondary air $W_s$ from the drive rotor 3 towards the free rotor 9.

The or each duct may also have a varying wall thickness, as illustrated for example in the Figures to confer aerodynamic benefits and in particular to give a substantially straight line path for primary air flowing over the outer duct surface.

What is claimed is:

1. A duct assembly comprising a circular duct and an axial flow free rotor on a downstream side thereof; said duct being open at both ends and adapted to substantially separate a unidirectional fluid stream into an inner partial stream within the duct and an outer partial stream outside the duct; said duct having an inner surface comprising a convergent surface and a divergent surface; said free rotor having a hub with a plurality of arms extending radially outwardly from said hub wherein each of said arms comprises a radially outer portion and a radially inner portion; the radially inner portions terminating at a ring having through passages connecting the inner stream to the outer stream; said ring having a radially inner surface at an upstream edge thereof, adjacent the radially inner surface of said duct at the downstream edge thereof; and the radially outer portions extending from said ring and comprising blades responsive to said outer partial stream to cause the free rotor to rotate unidirectionally in use; and wherein said free rotor includes extraction means adapted to draw fluid from said inner partial stream along the divergent surface of the duct towards the free rotor from the upstream side thereof, and to cause a part of said inner partial stream to flow radially outwards via said ring to mix with said outer partial stream moving downstream of the free rotor; the fluid drawn through the through passages of the ring from the inner stream to the outer stream causing a redistribution of flow through the duct so as to provide boundary layer control to prevent premature separation of fluid along the inner surface of the duct.

2. A duct assembly according to claim 1 wherein said arms are equally spaced.

3. A duct assembly according to claim 1 wherein said arms are symmetrical and of equal length.

4. A duct assembly according to claim 1 and wherein said free rotor further includes blades adapted to draw said part of the inner partial stream radially outwardly from the upstream to the downstream side via said ring.

5. A duct assembly according to claim 1 wherein said blades are hollow, and each define a through passage from the radially inner portion to the radially outer tip thereof.

6. A duct assembly according to claim 1 wherein upstream of said free rotor, the duct diverges in the flow direction of said unidirectional fluid stream towards said free rotor.

7. A duct assembly according to claim 1 and including a generally coaxial inner duct which diverges in the direction of the fluid stream towards said free rotor, the ducts together defining an annular volume upstream of said free rotor.

8. A duct assembly according to claim 1 and further comprising a drive rotor upstream of said free rotor and having a common axis of rotation, the drive rotor being responsive to the inner partial stream to cause unidirectional rotation thereof, and the drive rotor being adapted for connection to a generator.

9. A duct assembly according to claim 8 wherein said drive rotor is a propellor.

10. A duct assembly according to claim 9 and mounted on a stand for pivoting in a horizontal plane.

11. A duct assembly according to claim 8 wherein said duct diverges upstream of said drive rotor.

12. A duct assembly according to claim 8 wherein said free rotor and drive rotor are adapted to rotate in opposite directions in response to said fluid stream.

* * * * *